United States Patent [19]

Jas

[11] Patent Number: 4,537,699
[45] Date of Patent: Aug. 27, 1985

[54] PROCESS FOR IMPROVING THE RHEOLOGICAL PROPERTIES OF A SUSPENSION OF PRECIPITATED SILICA

[75] Inventor: Jean-Noel Jas, Fontaine-sur-Saone, France

[73] Assignee: Rhone-Poulenc Specialites Chimiques "Les Miroirs", France

[21] Appl. No.: 554,640

[22] Filed: Nov. 23, 1983

[30] Foreign Application Priority Data

Nov. 24, 1982 [FR] France ................................ 82 19646

[51] Int. Cl.$^3$ ........................ B01J 13/00; C01B 33/14; C01B 33/18; C01B 33/141
[52] U.S. Cl. ................................. 252/313.2; 423/266; 423/339
[58] Field of Search ............... 252/313.1, 313.2, 315.6; 423/339, 265, 266, 274, 275; 502/439

[56] References Cited

U.S. PATENT DOCUMENTS

| | | | |
|---|---|---|---|
| 2,555,282 | 5/1951 | Ashley | 252/315.6 X |
| 2,892,797 | 6/1959 | Alexander et al. | 252/313.2 |
| 3,007,878 | 11/1961 | Alexander et al. | 252/313.2 |
| 3,208,823 | 9/1965 | Baker et al. | 106/288 B |
| 3,291,626 | 12/1966 | Shurling et al. | 106/193 R |
| 3,691,089 | 9/1972 | Janson et al. | 252/313.2 |
| 3,755,183 | 8/1973 | Fahn et al. | 252/194 |
| 4,036,663 | 7/1977 | Williams et al. | 106/288 B |

FOREIGN PATENT DOCUMENTS

580279  7/1959  Canada.

OTHER PUBLICATIONS

Chemical Abstracts, vol. 81, No. 8, 26-08-197 4, p. 99, Resume No. 39081z: Dispersed Pigment Compositions Using Sodium Aluminate Without the Aid of a Dispersoid.
Rhone-Poulenc 175 MP Micropearl.
Ser. No. 314,485, filed Oct. 1981, by Ray et al.

Primary Examiner—Howard S. Williams
Attorney, Agent, or Firm—Finnegan, Henderson, Farabow, Garrett & Dunner

[57] ABSTRACT

The present invention provides a process for improving the rheological properties of a suspension of precipitated silica by the addition of an aluminum compound, thereby producing a sprayable suspension or slurry with a pH of greater than 3.5, a solids content of at least about 15% by weight, which may be spray dried to form silica in either powder or microbead form. In a preferred embodiment, the aluminum compound added to the suspension is in the form of sodium aluminate.

38 Claims, No Drawings

PROCESS FOR IMPROVING THE RHEOLOGICAL PROPERTIES OF A SUSPENSION OF PRECIPITATED SILICA

FIELD OF THE INVENTION

This invention relates to a process for improving the rheological properties, particularly the stability, of a suspension of precipitated silica, to produce a sprayable silica suspension or slurry which may be spray dried to form silica powder or silica microbeads. The compounds used in the process and the suspension produced thereby are also disclosed.

BACKGROUND OF THE INVENTION

It is known in the art that the wet process mode of producing a precipitated silica involves (1) forming a gel, preferably by mixing sodium silicate and sulfuric acid in a solution containing a salt, and (2) breaking the gel, thereby obtaining a precipitated suspension of silica. The suspension is filtered, forming a filter cake, washed free of occluded salts, and slaked, forming a slurry by adding water, which makes the filter cake sufficiently fluid to be spray dried. However, spraying also requires the use of an atomizable suspension, which is difficult to produce.

Attempts have been made to obtain such an atomizable suspension, but each process has either economical or practical drawbacks. For example, in one process, the procedure can only be used with dry extracts and a filter cake low in silica content, but this process requires high levels of drying energy. Mechanical slaking systems, which reduce the viscosity of the filter cake, also require a substantial amount of energy.

Other attempts to produce an atomizable suspension include the product disclosed in European Pat. No. 18,666, which is produced by spray drying a suspension with a pH greater than 4, preferably between 4.5 and 6. However, the stability of a silica suspension decreases as the pH value moves away from the isoelectric point, which for most silica suspensions is at a pH of greater than 3.5–4, therefore, the suspension cannot be maintained at the proper pH without agitation, a considerable efficiency constraint. Thus, the process has limited industrial use. Similarly, U.S. Pat. No. 3,208,823 discloses a process of acidifying a filter cake, but that process is not successful when neutral pH conditions are required, such as for use in rubber.

The present invention addresses these difficulties by producing a stable, easily atomizable suspension with improved rheological properties and a high solids content. The process of the present invention concerns stable suspensions of precipitated silica, with a relatively high solids content, and a pH value greater than 3.5–4.

SUMMARY OF THE INVENTION

The present invention provides a process for making a sprayable suspension of precipitated silica comprising the steps of providing an aqueous suspension of silica having a solids content of at least about 15% by weight, preferably at least about 20% by weight, and adding to the aqueous suspension an aluminum compound, preferably sodium aluminate, to produce a sprayable suspension having a pH value greater than 3.5, preferably 3.5 to 7.5 and most preferably 5 to 7. In addition, the present invention provides a process for making a spray dried silica product by spray drying this suspension, preferably in powder or microbead form.

Stated in its broadest sense, the invention is characterized by the addition of an aluminum compound to a silica suspension, thereby producing a silica product that can be spray dried. In a preferred embodiment of the invention, the aluminum compound added to the suspension is sodium aluminate. In a broad sense, any compound of aluminum which performs the same function as the sodium aluminate and which does not affect the properties of the silica can be used without departing from the scope of the present invention.

The aluminum compound can be added in various ways and forms, as long as the desired pH is produced and the silica precipitation process is not adversely affected. For example, the aluminum compound can be added with the starting reactants, in the course of precipitation or slaking, or at the filter cake stage. Thus, the initial and final pH of the suspension, its initial and final rheological properties, as well as the characteristics of the final product should be taken into account when adding the aluminum compound.

The solids content of the suspension is also variable. For economic and technical reasons, it is known that it is desirable to employ a substantial quantity of solids. In accordance with the process of the invention, suspensions containing more than 15% silica on a dry basis, preferably more than 20%, can be used.

DETAILED DESCRIPTION OF THE INVENTION

In accordance with the invention as embodied herein, the sprayable suspension of precipitated silica can be made by forming a precipitated silica, filtering the precipitated suspension to form a filter cake with a solids content of at least about 15% by weight, preferably about 20% by weight, slaking the filter cake to form a sprayable suspension, and adding an aluminum compound, preferably sodium aluminate, to produce a sprayable suspension, with a pH greater than 3.5, which is then spray dried to form silica in powder or microbead form.

It is preferred that the aluminum compound be an alumina, most preferably sodium aluminate. The alumina or sodium aluminate can be added with the starting reactants or in the course of precipitation. Additionally, in accordance with a particular mode of carrying out the present invention, a solution of sodium aluminate can be added to the filter cake, while the medium is maintained in a homogeneous condition. In another form of the invention, the filter cake can be washed with acidified water, and then during the slaking operation, the pH can be increased with an aluminate solution preferably in a solution rich in $Na_2O$.

The amount of alumina, added in the form of sodium aluminate, should be sufficient to achieve the desired pH and to obtain a stable, easily atomizable suspension. A suitable amount, in practice, expressed in terms of anhydrous alumina to anhydrous silica, is from 500 to 7000 ppm. The medium should be maintained in a homogenous condition throughout the addition of the alumina.

The addition of the alumina increases the pH of the suspension, and decreases the viscosity of the suspension. A sprayable suspension having a pH value greater than the 3.5–4 range, and preferably from 5 to 7.5 and a viscosity of less than 8 Pa/s (Pascals/second), preferably about 2.5 Pa/s, is desirably produced. The sprayable suspension should have a high solids content of at least about 15% by weight, preferably at least about 20% by weight.

The process of the invention produces suspensions which can be spray dried to produce silica in powder or microbead form. The spray dried products are useful, for example, as fillers for rubber. The dried silica products produced are particularly well suited to the production of microbeads, which have approximately ten to fifty times better fluidity than the corresponding powder form products. Thus, the substance does not turn to dust when vulcanized.

The microbeads can be produced in accordance with European Pat. No. 18,866 which provides: (1) a mean particle (or microbead) size of more than 150μ, preferably between 200 and 300μ, 2) a packing density (in compacted condition) in accordance with the AFNOR 30042 standard of higher than 0.200, preferably from 0.28 to 0.32, 3) a BET surface area of between 100 and 350 m²/g, and 4) a CTAB surface area of between 100 and 350 m²/g.

The BET specific area is determined in accordance with the BRUNAUER-EMMET-TELLER method, as described in The Journal Of The American Chemical Society, vol. 60, pg. 309, February 1938. The CTAB area denotes the external area, determined by the adsorption of cetyl trimethyl ammonium bromide, which has a pH of 9, using the method disclosed by JAY, JANZEN and G. KRAUS in Rubber Chemistry and Technology 44 (1971), pg. 1287–1296.

Microbead substances made in this manner for use as a filler for rubber can provide excellent dispersion and a spherical shape for fast and precise feeding, and can be made to be sufficiently heavy to prevent dispersion into the air, sufficiently fine not to break during handling, and sufficiently strong not to form dust particles. In addition, the high density of the microbead product can provide an increase in productivity.

The following examples are illustrative and are not to be construed as limiting the invention delineated in the claims.

EXAMPLES

EXAMPLE 1

An aluminate, $2Na_2O.Al_2O_3$, in the form of a solution containing 115 g/l of $Al_2O_3$ and 140 g/l of $Na_2O$, was progressively added over a period of 25 minutes to 25 kg of a silica filter cake, which comprised 22% dry extract and 3% $Na_2SO_4$ and had a pH of 4.8. The aluminate was added until the pH was 6.15, which corresponded to approximately 800 ppm of $Al_2O_3$, expressed in terms of anhydrous alumina to anhydrous silica. The medium was maintained in a homogenous condition while the aluminum was added. The viscosity of the suspension was reduced from 26.8 Pa/s. to 2.4 Pa/s.

EXAMPLE 2

The viscosity of the cake prepared in Example 1 was reduced to 0.08 Pa/s., by adding an acid until the pH was 2.7. The above-mentioned aluminate was then added until the pH was back to 4.8, which increased the viscosity to 8 Pa/s. The aluminate was added until the pH was 6.2, which corresponded to the addition of approximately 3,000 ppm of $Al_2O_3$, and which reduced the viscosity to 0.6 Pa/s.

The viscosities in Examples 1 and 2 were measured using the BROOKFIELD RVT viscosimeter, at 5 revolutions and at 40° C.

EXAMPLE 3

The aluminate of example 1 was added to 25 kg of a filter cake, which comprised 22.8% dry extract and 1.3% $Na_2SO_4$. The cake had a pH of 5.15 and a viscosity, when measured with the BROOKFIELD RVT viscosimeter, of 68 Pa/s. at 36° C. The aluminate was added until the pH of the cake was 6.75, an amount equivalent to 1,200 ppm, at which time the viscosity was about 11.8 Pa/s.

The proportion of dry extract was then reduced, by the addition of water, to 19.7%, which reduced the viscosity to 2.5 Pa/s. Additional aluminate was added until the pH was back to 6.75, which stabilized the filter cake at the same viscosity value.

The purpose of this example was to show that an increase in the amount of dry extract used can produce a corresponding increase in the efficiency of the process.

EXAMPLE 4

A silica in microbead form was prepared in accordance with European Pat. No. 18,866 for use in rubber.

1,500 ppm of alumina in aluminate form was added to 250 kg of a silica filter cake, which had a pH of 4.4 and comprised 22% dry extract and 2.6% sulphate. A silica with a pH of 6.1 was produced.

TESTS

The figures below correspond to an average over twenty tests.

Test 1

After spray drying in a liquid pressure nozzle, a product with the following characteristics was obtained:

CTAB surface area = 177 m²/g
BET surface area = 180 m²/g
Mean size of the particles = 200 μm
Density in the compacted state = 0.3 (AFNOR 30042).

Test 2

The microbeads were then tested in rubber with the following formulation:

| | |
|---|---|
| SBR 1509 | 90.00 |
| PEG 4000 | 3.00 |
| STEARIC ACID | 3.00 |
| ZINC OXIDE | 3.00 |
| ANTIOXIDANT PERMANAX ® OD | 2.00 |
| MASTER BATCH A | 7.25 |
| MASTER BATCH B | 7.25 |
| SILICA | 50.00 |

In the above formula, the various substances correspond to the following chemical formula and/or standards:

SBR 1509: Butadiene styrene rubber—see page 25, The Synthetic Rubber Manual, 76th edition PEG 4000: Polyethylene glycol with a molecular weight of about 4000

Antioxidant PERMANAX ® OD—Octyl diphenylamine VULCAFOR ® DOTG—Diortholylguanidine VULCAFOR ® MBTS—Benzothiazyl disulphide

| | | |
|---|---|---|
| Master Batch A (accelerator) | MBTS | 0.75 |
| | DOTG | 1.5 |
| | | 7.25 |
| Master Batch B (sulphur) | SBR | 4.75 |
| | SULPHUR | 2.5 |
| | | 7.25 |

The results obtained are as follows:

| | |
|---|---|
| Cm = | 10 |
| CM = | 86 |
| $T_{90}$ = | 9 min 45 s |
| Rupture strength | 19.6 MPa |
| Elongation to rupture % | 695 |
| Trouser-type tearing | 22 kN/m |
| 300% modulus | 4 MPa |
| Shore A hardness | 70 |

Test 3

The results of a reference substance, a filter cake with a pH of 4.8, not treated in accordance with the invention, were as follows:

| | |
|---|---|
| BET | 173 $m^2/g$ |
| CTAB | 172 $m^2/g$ |
| Particle size | 200 μm |
| Cm = | 11 |
| CM = | 85 |
| $T_9O$ = | 9 min 30 s |
| Rupture strength | 20.2 MPa |
| Elongation to rupture | 720% |
| Trouser-type tearing | 21.4 kN/m |
| 300% modulus | 4.3 MPa |
| Shore hardness | 70 |

These substances are therefore comparable.

The rubber tests correspond to the following standards:

Monsanto rheometer ASTM D 2084
minimum couple Cm
maximum couple CM

| | |
|---|---|
| Rupture strength | ASTM D 412-51 T |
| 300% modulus | ASTM D 412-51 T |
| Elongation % | ASTM D 412-51 T |
| Trouser-type tearing | NFT 47-126 |
| Shore A hardness | ASTM D 2240-75 |

By the practice of the present invention, therefore, the addition of an aluminum compound to a preciptated silica suspension as described herein can result in a stable, sprayable suspension of pH greater than about 3.5 and a suitably low viscosity, which can be spray dried to form useful silica products. Variations can be made in the process steps, conditions and materials without departing from the scope or spirit of the invention as claimed herein.

I claim:

1. A process for making a sprayable suspension of precipitated silica comprising the steps of:

a. providing an aqueous suspension of precipitated silica having a solids content of at least about 15% by weight; and b. adding to the aqueous suspension an aluminum compound to produce a sprayable suspension having a pH value greater than 3.5.

2. A process according to claim 1 wherein said aluminum compound is sodium aluminate.

3. A process according to claim 2 wherein the amount of said sodium aluminate, expressed in terms of anhydrous alumina to anhydrous silica, is from 500 to 7,000 ppm.

4. A process according to claim 1 wherein said sprayable suspension has a pH in the range of from 3.5 to 7.5.

5. A process according to claim 1 wherein said sprayable suspension has a pH in the range of from 5 to 7.5.

6. A process according to claim 1 wherein said sprayable suspension has a solids content of at least about 20% by weight.

7. A process for making a sprayable suspension of precipitated silica comprising the steps of:

a. forming a precipitated silica suspension;

b. filtering the precipitated suspension to form a filter cake with a solids content of at least about 15% by weight;

c. slaking the filter cake to form a sprayable suspension; and d. adding sodium aluminate during any of steps (a) through (c) to produce a sprayable suspension having a pH greater than 3.5.

8. A process according to claim 7 wherein said sodium aluminate is added with the starting reactants.

9. A process according to claim 7 wherein said sodium aluminate is added in the course of precipitation.

10. A process according to claim 7 wherein said sodium aluminate is added to the silica filter cake.

11. A process according to claim 7 wherein said sodium aluminate is added in the course of slaking.

12. A process according to claim 7 wherein said sprayable suspension has a pH in the range of from 3.5 to 7.5.

13. A process according to claim 7 wherein said sprayable suspension has a pH in the range of from 5 to 7.5.

14. A process according to claim 7 wherein the amount of said sodium aluminate, expressed in terms of anhydrous alumina to anhydrous silica, is from 500 to 7,000 ppm.

15. A process according to claim 7 wherein said sprayable suspension has a solids content of at least about 20% by weight.

16. A process according to claim 7 wherein said sprayable suspension has a viscosity of less than 8 Pa/s.

17. A process according to claim 7 wherein said sprayable suspension has a viscosity of about 2.5 Pa/s.

18. A process for making a spray dried product comprising the steps of:

a. providing an aqueous suspension of precipitated silica having a solids content of at least about 15% by weight;

b. adding to the aqueous suspension an aluminum compound to form a sprayable suspension having a pH value greater than 3.5; and c. spray drying the suspension.

19. A process according to claim 18 wherein said aluminum compound is sodium aluminate.

20. A process according to claim 19 wherein the amount of said sodium aluminate, expressed in terms of anhydrous alumina to anhydrous silica, is from 500 to 7,000 ppm.

21. A process according to claim 18 wherein said sprayable suspension has a pH in the range of from 3.5 to 7.5.

22. A process according to claim 18 wherein said sprayable suspension has a pH in the range of from 5 to 7.5.

23. A process according to claim 18 wherein said sprayable suspension has a solids content of at least about 20% by weight.

24. The process according to claim 18 wherein said suspension is spray dried to form silica in microbead form.

25. The process according to claim 18 wherein said silica suspension is spray dried to form silica in powder form.

26. A process for making a sprayable suspension of precipitated silica comprising the steps of:
 a. forming a precipitated silica suspension;
 b. filtering the precipitated suspension to form a filter cake with a solids content of at least about 15% by weight;
 c. slaking the filter cake to form a sprayable suspension; and
 d. adding sodium aluminate during any one of steps (a) through (c) to provide a sprayable suspension with a pH value of greater than 3.5.

27. A process according to claim 26 wherein said sodium aluminate is added during step (a).

28. A process according to claim 26 wherein said sodium aluminate is added in the course of precipitation.

29. A process according to claim 26 wherein said sodium aluminate is added to the silica filter cake.

30. A process according to claim 26 wherein said sodium aluminate is added in the course of slaking.

31. A process according to claim 26 wherein said sprayable suspension has a pH in the range of from 3.5 to 7.5.

32. A process according to claim 26 wherein said sprayable suspension has a pH in the range of from 5 to 7.

33. A process according to claim 26 wherein the amount of said sodium aluminate, expressed in terms of anhydrous alumina to anhydrous silica, is from 500 to 7,000 ppm.

34. A process according to claim 26 wherein said sprayable suspension has a solids content of at least about 20% by weight.

35. A process according to claim 26 wherein said silica suspension is spray dried to form silica in powder form.

36. A process according to claim 26 wherein said silica suspension is spray dried to form silica in microbead form.

37. A process according to claim 26 wherein said sprayable suspension has a viscosity of less than 8 Pa/s.

38. A process according to claim 26 wherein said sprayable suspension has a viscosity of about 2.5 Pa/s.

* * * * *